(12) United States Patent
Shimamawari

(10) Patent No.: US 12,052,151 B2
(45) Date of Patent: Jul. 30, 2024

(54) NETWORK DEVICE AND METHOD FOR CONTROLLING THE SAME

(71) Applicant: CANON KABUSHIKI KAISHA, Tokyo (JP)

(72) Inventor: Takuji Shimamawari, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/320,089

(22) Filed: May 18, 2023

(65) Prior Publication Data

US 2023/0403213 A1    Dec. 14, 2023

(30) Foreign Application Priority Data

Jun. 13, 2022    (JP) ................................ 2022-094791

(51) Int. Cl.
*G06F 15/173*    (2006.01)
*H04L 43/045*    (2022.01)
*H04L 43/091*    (2022.01)

(52) U.S. Cl.
CPC .......... *H04L 43/045* (2013.01); *H04L 43/091* (2022.05)

(58) Field of Classification Search
CPC ........................... H04L 43/045; H04L 43/091
See application file for complete search history.

(56) References Cited

U.S. PATENT DOCUMENTS

2022/0361021 A1* 11/2022 Wangler ................ H04W 24/08

FOREIGN PATENT DOCUMENTS

JP    2020119036 A    8/2020

* cited by examiner

*Primary Examiner* — Padma Mundur
(74) *Attorney, Agent, or Firm* — Canon U.S.A., Inc. IP Division

(57) ABSTRACT

A communication test management application of an image forming apparatus instructs client applications respectively corresponding to services provided by a cloud server to execute communication tests, and displays communication test results. At this time, all the communication test results for basic services are displayed. As for a contract-based service, the communication test result of the client application corresponding to the contract-based service in a contracted state is displayed, whereas the communication test result of the client application corresponding to the contract-based service in a non-contracted state is not displayed.

7 Claims, 10 Drawing Sheets

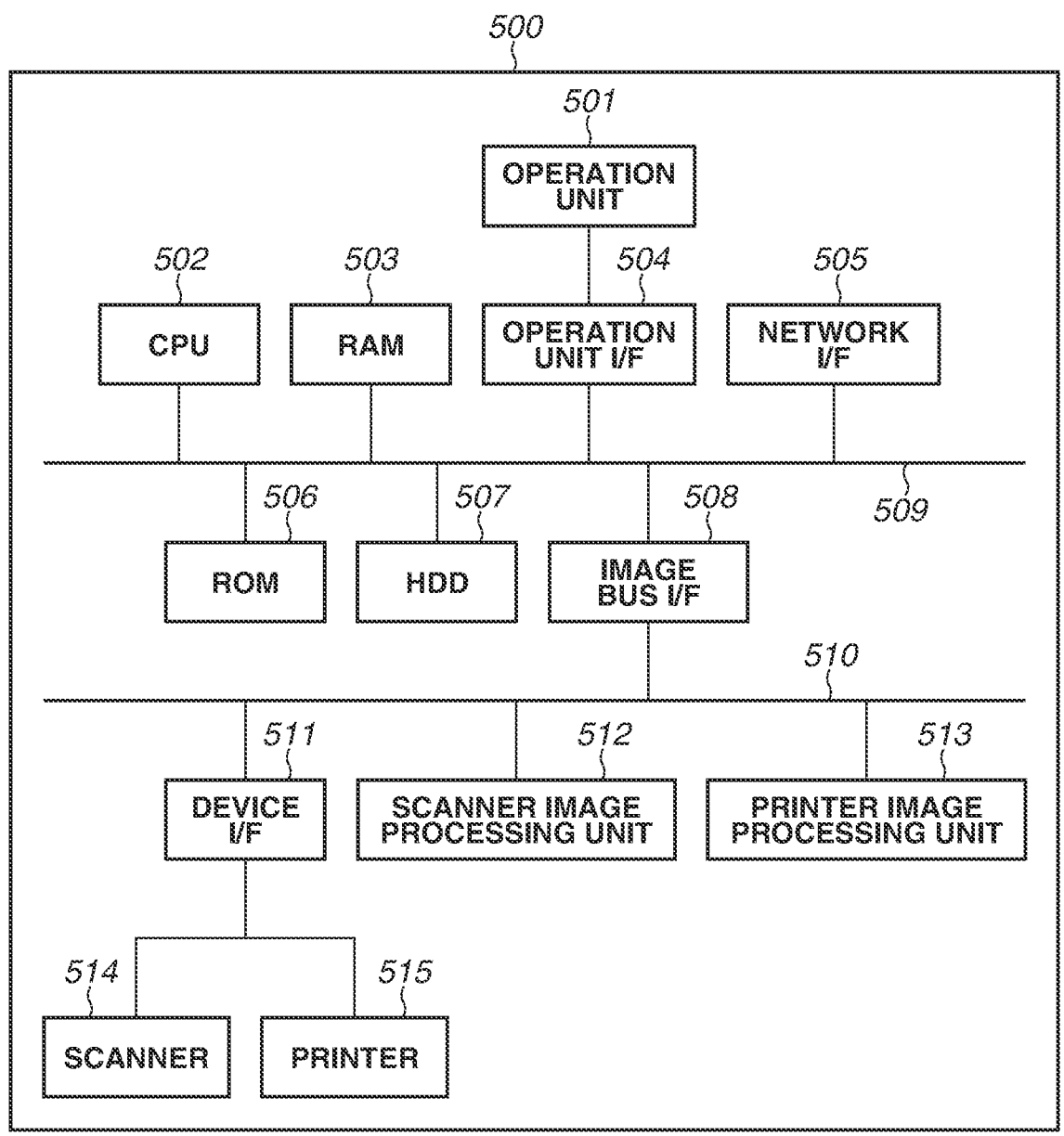

FIG.4A
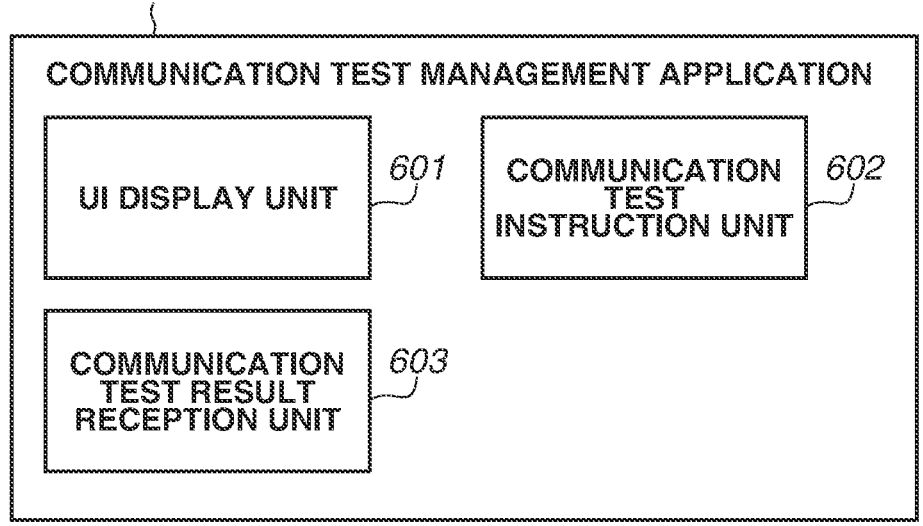
FIG.4B
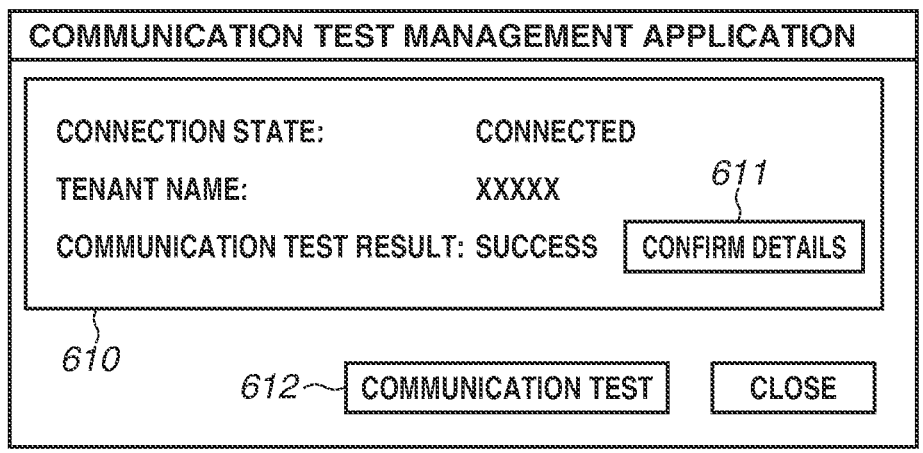
FIG.4C
| APPLICATION NAME | EXECUTION DATE | RESULT | DETAILS |
|---|---|---|---|
| APPLICATION A | 2020/02/15 13:30:45 | SUCCESS | |
| APPLICATION C | 2020/02/15 13:30:39 | FAILURE | ERROR CODE: XX-YYYY FIREWALL SETTING IS INSUFFICIENT |

FIG.9

DETAILS OF COMMUNICATION TEST RESULTS — www.cloud.xxx/comtest/result.html

| APPLICATION NAME | SERVICE USE STATE | EXECUTION DATE | RESULT | DETAILS |
|---|---|---|---|---|
| APPLICATION A | IN USE | 2020/02/15 13:30:45 | SUCCESS | |
| APPLICATION B | NOT IN USE | 2020/02/15 13:30:50 | FAILURE | ERROR CODE: XX-ZZZZ PROXY SETTING IS INSUFFICIENT |
| APPLICATION C | IN USE | 2020/02/15 13:30:39 | FAILURE | ERROR CODE: XX-YYYY FIREWALL SETTING IS INSUFFICIENT |

1001

CLOSE

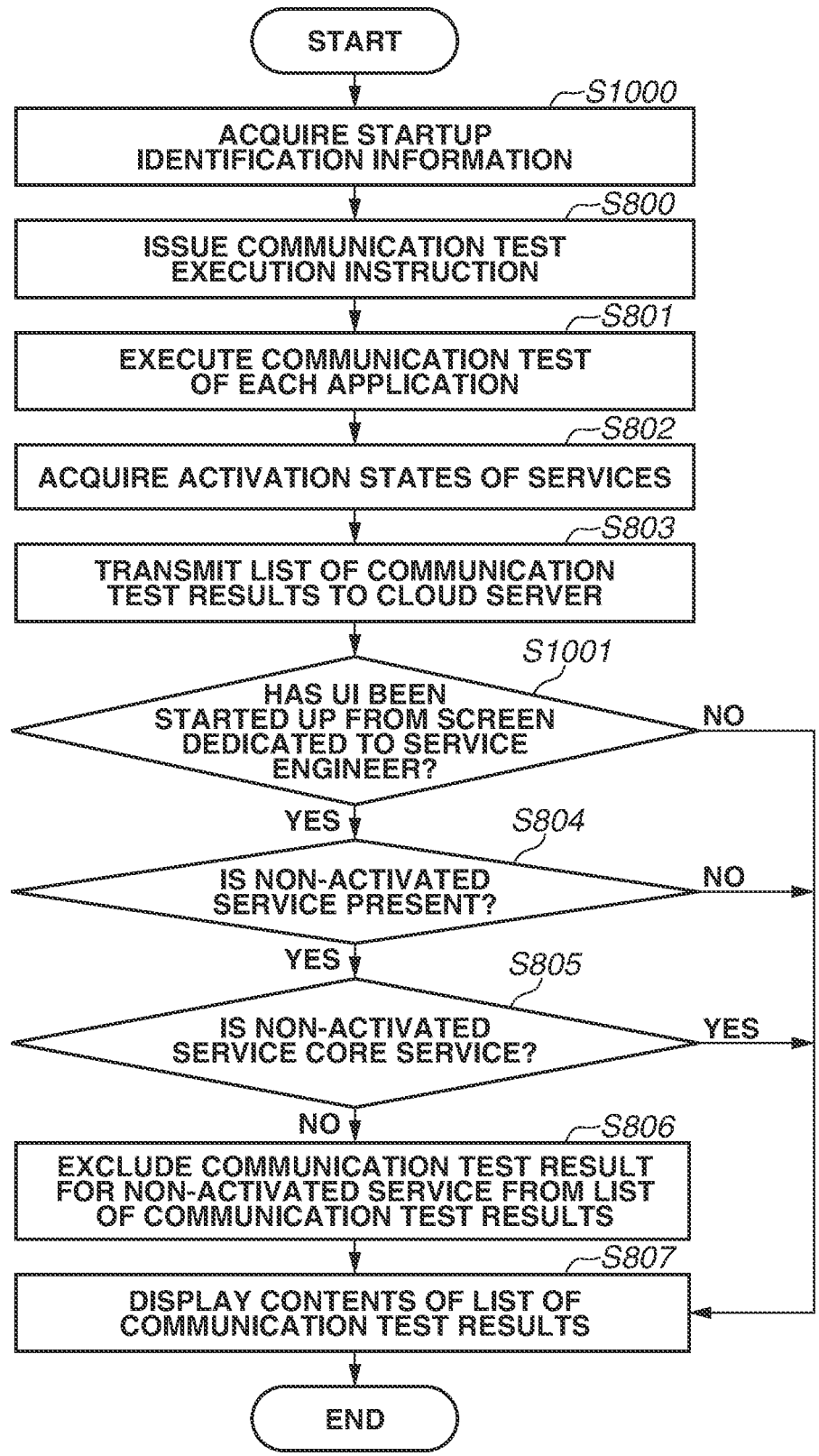

NETWORK DEVICE AND METHOD FOR CONTROLLING THE SAME

BACKGROUND

Field of the Disclosure

The present disclosure relates to a network device and a method for controlling the network device.

Description of the Related Art

In recent years, it has become common to use various services by connecting a network device such as an image forming apparatus to an external cloud server. For example, the use of the service for monitoring the image forming apparatus enables using an automatic delivery service for consumables with small remaining amounts. The use of the backup service enables using a periodic backup service of setting values and application information of the image forming apparatus, and using a restoration service in case of a failure of the image forming apparatus. To meet such needs, a cloud server is provided as a collection of various services selectable by a user. Hereinafter, a server providing each individual service is referred to as a "resource server".

To use a desired service, the user first makes a contract with a service provider, and the service provider operates the cloud server to put the desired service in a usable state (which is hereinafter referred to as "activate a service"). Thereafter, at the time of installation of the image forming apparatus in the user's environment, a service engineer performs an operation to connect the image forming apparatus to the cloud server.

At this time, the connection to the cloud server is successful but a connection to each individual resource server fails in some cases. The main reason is that the resource servers can be different in domain, and the propriety of access to each domain depends on a network configuration, such as a firewall setting, and a security setting. For this reason, at the time of installation of the image forming apparatus, it is common that a communication test with each of the resource servers is executed.

However, in the case of a system in which a plurality of client applications respectively cooperating with resource servers operates in one image forming apparatus, executing communication tests with the resource servers individually is not efficient.

Japanese Patent Application Laid-Open No. 2020-119036 discusses a technique for efficiently executing communication tests of a plurality of client applications and a technique for displaying results of the communication tests as a list.

Meanwhile, the user may newly activate a service during operation of the image forming apparatus. Thus, at the time of installation of the image forming apparatus, a non-activated service may be present. In this case, to surely start use of the service when the service that is not currently activated is activated, executing the communication test in advance is effective.

However, at the time of installation of the image forming apparatus, settings such as a firewall setting are not yet performed in a network environment of the user, and the communication test is highly likely to fail. Even when the result of the communication test is displayed at the time of the installation, the service engineer is unable to cope with the failure, and it may be misunderstood that the installation work has failed.

The technique discussed in Japanese Patent Application Laid-Open No. 2020-119036 provides a configuration in which the results of the communication tests with all of the services are displayed, and does not address the above-described issues.

SUMMARY

The present disclosure is directed to a network device having a mechanism capable of notifying a service engineer of only necessary results among results of communication tests, executed by the network device, for services provided by a service provision system, and enabling the service engineer to confirm the communication test results without confusion and misunderstanding.

According to an aspect of the present disclosure, a network device on which a plurality of client applications respectively corresponding to a basic service and a contract-based service that are provided by a service provision system is installed includes a display, at least one memory storing instructions, and at least one processor executing the instructions causing the network device to instruct both of a first client application corresponding to the basic service and a second client application corresponding to the contract-based service, among the plurality of client applications, to execute communication tests for the basic service and the contract-based service, respectively; receive communication test results respectively from the first client application and the second client application, transmit the communication test result of the first client application and the communication test result of the second client application to the service provision system, in a case where the contract-based service is in a contracted state, display both of the communication test result of the first client application and the communication test result of the second client application on the display, and in a case where the contract-based service is in a non-contracted state, display the communication test result of the first client application on the display without displaying the communication test result of the second client application.

Further features of the present disclosure will become apparent from the following description of exemplary embodiments with reference to the attached drawings.

BRIEF DESCRIPTION OF THE DRAWINGS

FIG. 3 is a block diagram illustrating a software configuration of an image forming apparatus.

FIG. 4A is a block diagram illustrating a software configuration of a communication test management application. FIGS. 4B and 4C are diagrams illustrating screens of the communication test management application.

FIG. 9 is a diagram illustrating a communication test result details screen provided by a platform server.

FIG. 10 is a flowchart illustrating communication test processing according to one or more aspects of the present disclosure.

DESCRIPTION OF THE EMBODIMENTS

Figure 1:
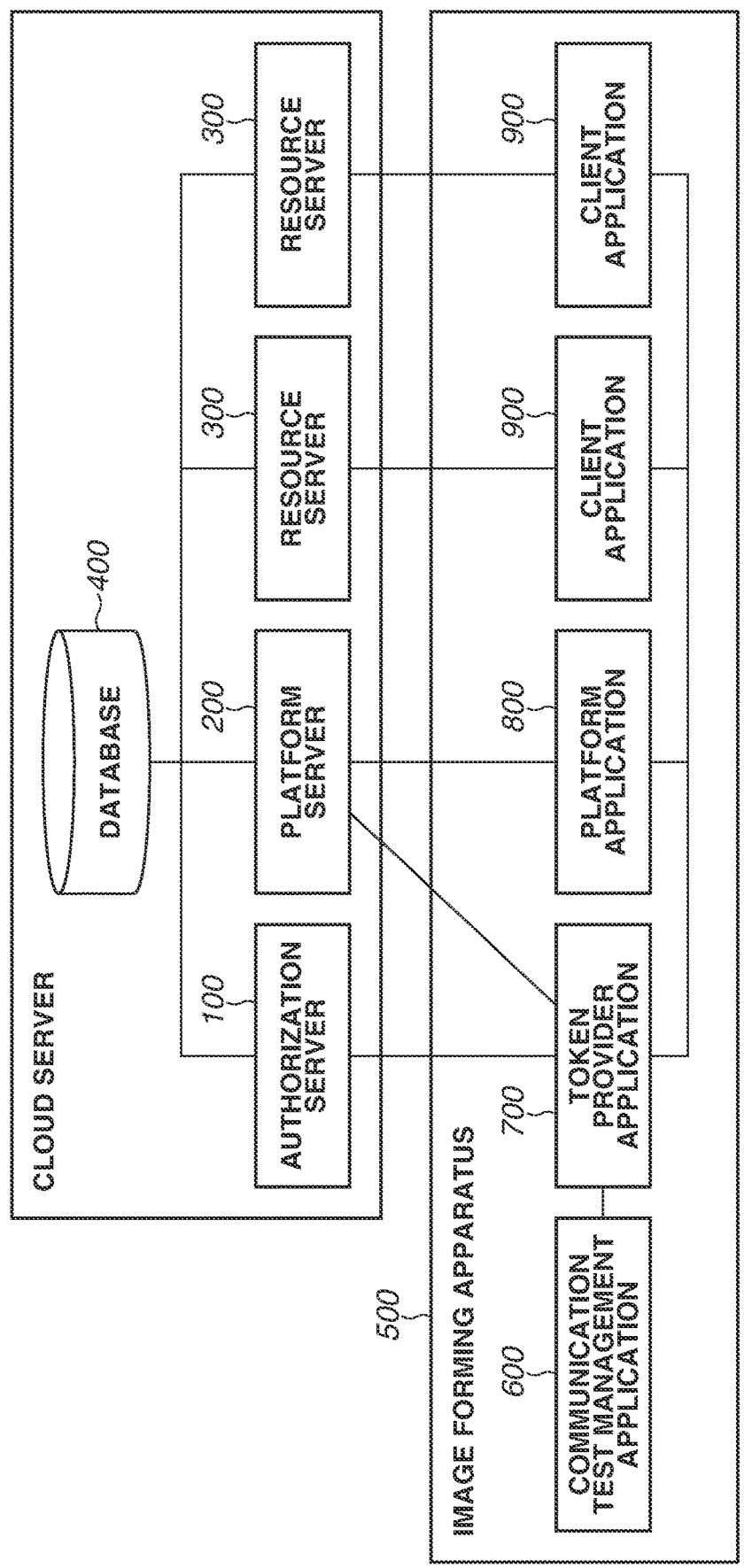
FIG. 1 is a block diagram illustrating a device configuration of a system according to one or more aspects of the present disclosure.

FIG. 1 illustrates an example of a device configuration of a system according to a first exemplary embodiment.

The system according to the present exemplary embodiment includes a cloud server and an image forming apparatus 500 that are connected to each other via a network. In the present exemplary embodiment, the image forming apparatus 500 is described as an example of a network device, but the present exemplary embodiment is applicable to the other network devices. For example, the present exemplary embodiment is applicable to a network home appliance, a network camera, and a navigation system.

The cloud server will be described first.

The cloud server is a service provision system that provides various kinds of services, and includes an authorization server 100, a platform server 200, and a resource server 300.

The authorization server 100 includes an application programming interface (API) for implementing authentication of the image forming apparatus 500 and issuance of an access token. The access token is authentication/authorization information to be used when the image forming apparatus 500 serving as a client uses the API published by each of the authorization server 100, the platform server 200, and the resource server 300. Examples of an authentication/authorization protocol include "OAuth2.0".

The platform server 200 is a core server in the cloud server. To use the services provided by the cloud server, the image forming apparatus 500 is to be connected to the platform server 200. The platform server 200 manages a service use state (a contract state) of each user.

The services provided by the authorization server 100 and the platform server 200 are core services (basic services) essential for connection to the cloud server. To use the services provided by the cloud server, the core services are to be activated.

The resource server 300 provides an individual service such as an automatic consumable delivery service, and includes an API for use of the service. In the cloud server, the resource server 300 provides a service based on an optional contract (a contract-based service). The user can make a contract as appropriate to use the service, so that the contracted service is activated. The number of resource servers 300 is not limited to one, and a plurality of (three or more) resource servers 300 can be provided.

The authorization server 100, the platform server 200, and the resource server 300 may be collectively simply referred to as "the servers". Implementation of the servers 100, 200, and 300 is not limited to the implementation using a cloud computing technique.

A database 400 stores data on each user who uses the cloud server, and data on the image forming apparatus 500. Examples of the stored data include a service activation state of each user. More specifically, when a certain service is activated for a user by a service provider, data indicating the service use state corresponding to the user is updated. The stored data can also include management data on each image forming apparatus 500 connected to the cloud server.

Examples of the management data include an error occurrence state, remaining amounts of consumables, and a log of a job.

The image forming apparatus 500 will be described next.

The image forming apparatus 500 is a multifunction peripheral obtained by combining a plurality of functions such as a scanner function, a printer function, a facsimile function, and a file transmission function in a copier. The image forming apparatus 500 may not necessarily include all of these functions.

The image forming apparatus 500 is a network device on which a plurality of client applications respectively corresponding to the plurality of services provided by the cloud server is installed. The client applications include a communication test management application 600, a token provider application 700, a platform application 800, and a client application 900.

The communication test management application 600 has a function of receiving a communication test execution operation from the user, and displaying communication test results on a user interface (UI) of the image forming apparatus 500.

The token provider application 700 performs authentication of the image forming apparatus 500 by using the API published by the authorization server 100, and provides, to the client application 900, the access token for use of the API of the resource server 300.

The platform application 800 has a function of connecting the image forming apparatus 500 to the cloud server by using the API published by the platform server 200. The platform application 800 also has a function of acquiring information from the database 400 and transmitting information to the database 400 via the platform server 200.

The token provider application 700 and the platform application 800 are the client applications for the core services (the basic services) of the cloud server.

The client application 900 provides, to the user, a service corresponding to a function provided by the client application 900 itself by using the API published by the resource server 300. The client application 900 is the client application for the contract-based service provided by the resource server 300. The number of client applications 900 is not limited to one, and a plurality of (three or more) client applications 900 can be provided.

The communication test management application 600, the token provider application 700, the platform application 800, and the client application 900 may be collectively simply referred to as "the applications".

Figure 2:
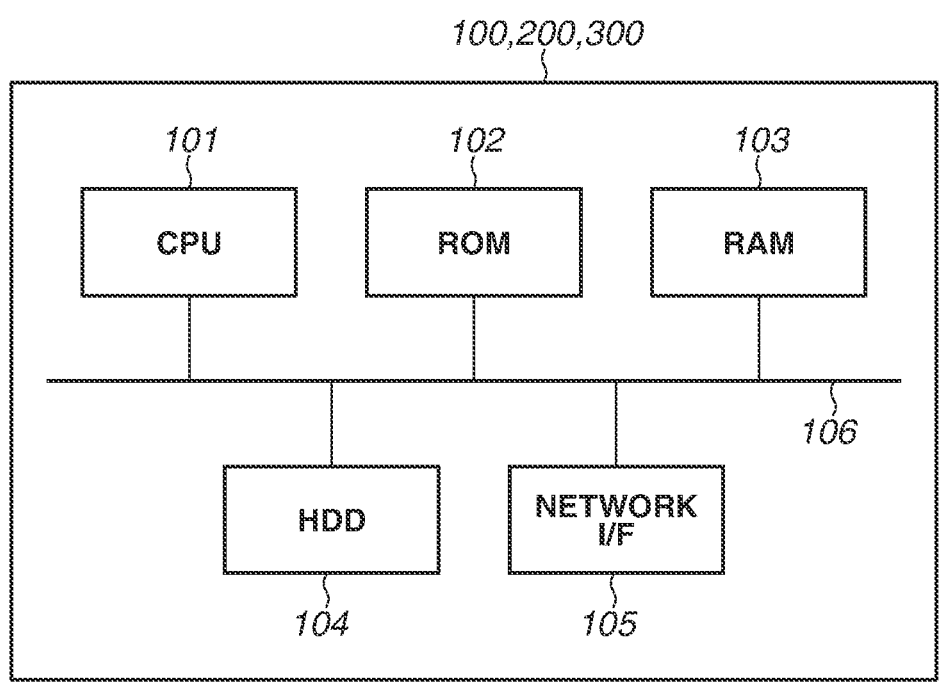
FIG. 2 is a block diagram illustrating a hardware configuration of each server.

FIG. 2 is a block diagram illustrating an example of a hardware configuration of each of the authorization server 100, the platform server 200, and the resource server 300. The servers 100, 200, and 300 have a similar hardware configuration and thus a common configuration is illustrated in FIG. 2. Each of the servers 100, 200, and 300 can perform interaction with the image forming apparatus 500 and the other servers without a UI and thus no UI is illustrated in FIG. 2. However, each of the servers 100, 200, and 300 can include, as an UI, hardware such as a keyboard, a pointing device, and a display.

A central processing unit (CPU) 101 reads out control programs stored in a read only memory (ROM) 102 to perform various kinds of control processing. A random access memory (RAM) 103 is a main memory of the CPU 101, and is used as a temporary storage area such as a work area. A hard disk drive (HDD) 104 stores various kinds of data and programs. In place of or together with the HDD 104, another storage device such as a solid state drive (SSD) can be provided.

A network interface (I/F) 105 connects the server 100, 200, or 300 to a network. The network OF 105 transmits and receives various kinds of information to and from another apparatus via the network. A system bus 106 is a data exchange path common to the hardware components configuring the server 100, 200, or 300.

FIG. 3 is a block diagram illustrating an example of a configuration of the image forming apparatus 500.

The image forming apparatus 500 includes an operation unit 501, a scanner 514, and a printer 515.

The image forming apparatus 500 also includes, as processing units relating to the operation unit 501, a CPU 502, a RAM 503, an operation unit OF 504, a network OF 505, a ROM 506, an HDD 507, an image bus OF 508, and a system bus 509.

The CPU 502 is a controller controlling the entire image forming apparatus 500. The RAM 503 provides a work memory for operation of the CPU 502, and also provides an image memory for temporarily storing image data. The ROM 506 is a boot ROM and stores a boot program of the system and various kinds of data. The HDD 507 stores an operating system (OS), various kinds of programs, image data, setting information, and the like. In place of or together with the HDD 507, another storage device such as an SSD can be provided. The CPU 502 executes the boot program in the ROM 506 to load the OS and the control programs stored in the HDD 507 into the RAM 503, and totally controls the image forming apparatus 500 based on the programs. The control includes execution of programs for implementing a flowchart to be described below.

The operation unit I/F 504 is an interface with the operation unit 501, and outputs, to the operation unit 501, the image data to be displayed on the operation unit 501. The operation unit I/F 504 also transmits, to the CPU 502, information input by the user via the operation unit 501. The network I/F 505 is connected to the network, and exchanges information with an external apparatus via the network. Examples of the external apparatus include the authorization server 100 and the platform server 200. The image bus I/F 508 is a bus bridge that connects the system bus 509 and an image bus 510 and performs data conversion. The system bus 509 is a data exchange path common to the hardware components configuring the image forming apparatus 500.

The image forming apparatus 500 further includes, as processing units relating to printing and scanning, the image bus 510, a device I/F 511, a scanner image processing unit 512, and a printer image processing unit 513.

The image bus 510 is a peripheral component interconnect (PCI) bus or a bus complying with the Institute of Electrical and Electronics Engineers (IEEE) 1394, and is a path that transfers image data at high speed. The device I/F 511 connects the scanner 514 and the printer 515 serving as image input/output devices to the hardware components, and performs synchronous/asynchronous conversion of the image data. The scanner image processing unit 512 performs processing, such as correction, modification, and editing, on an input image. The scanner 514 and the scanner image processing unit 512 can be provided as appropriate. The printer image processing unit 513 performs processing, such as correction and resolution conversion, on print output image data, based on performance of the printer 515.

FIG. 4A is a block diagram illustrating an example of a software configuration of the communication test management application 600. FIGS. 4B and 4C are diagrams illustrating examples of screens of the communication test management application 600. The description will be given with reference to each of FIGS. 4A to 4C.

FIG. 4A illustrates an example of the software configuration of the communication test management application 600. The software configuration functions when the CPU 502 of the image forming apparatus 500 executes the programs stored in the HDD 507.

A UI display unit 601 provides a UI for operation of the communication test management application 600 to the user via the operation unit 501, and receives an operation from the user.

Upon receiving an operation of issuing a communication test execution instruction from the UI display unit 601, a communication test instruction unit 602 instructs the token provider application 700 to execute a communication test with each of the services of the service provision system.

A communication test result reception unit 603 receives a communication test result of each client application 900 from the token provider application 700.

FIGS. 4B and 4C illustrate examples of screens of the communication test management application 600 displayed on the UI of the image forming apparatus 500 by the UI display unit 601. FIG. 4B illustrates an example of a basic screen of the communication test management application 600, and FIG. 4C illustrates an example of a communication test result details screen.

An area 610 displays a current state of connection to the cloud server. The area 610 is assumed to display information such as the connection state, a connection destination server name, and a latest communication test result, but the present exemplary embodiment is not limited thereto.

A confirm details button 611 is used to confirm details of the latest communication test result. When the user presses the confirm details button 611, the screen transitions to a screen illustrated in FIG. 4C that enables the user to confirm the details of the latest communication test result. The screen illustrated in FIG. 4C will be described in detail below with reference to the flowchart.

A communication test button 612 is used to execute communication tests. When the user presses the communication test button 612, the communication test instruction unit 602 issues a communication test execution instruction to a communication test instruction reception unit 702 (see FIG. 5) of the token provider application 700, so that the communication test of each of the applications is executed.

Figure 5:
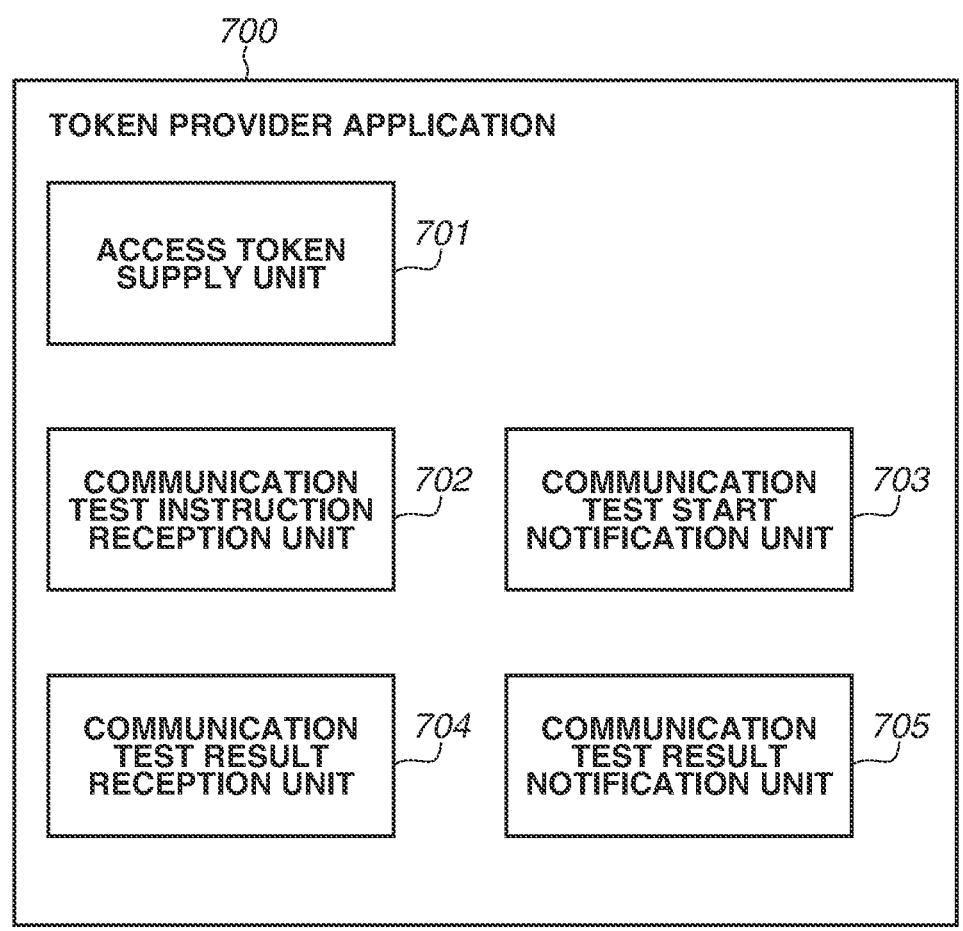
FIG. 5 is a block diagram illustrating a software configuration of a token provider application.

FIG. 5 is a block diagram illustrating an example of a software configuration of the token provider application 700. The software configuration functions when the CPU 502 of the image forming apparatus 500 executes the programs stored in the HDD 507.

An access token supply unit 701 requests the authorization server 100 to perform authentication of the image forming apparatus 500. In a case where the authentication is successful, the access token supply unit 701 acquires an access token. The access token supply unit 701 also has a function of supplying the acquired access token to each of the applications cooperating with the access token supply unit 701.

The communication test instruction reception unit 702 receives the communication test execution instruction from the communication test instruction unit 602.

A communication test start notification unit 703 instructs each of the applications (i.e., both of the client applications for the basic services and for the contract-based service(s)) to start the communication test in response to the reception of the instruction by the communication test instruction reception unit 702. At this time, the communication test start notification unit 703 provides, to each of the applications, the access token for communication with the corresponding server.

A communication test result reception unit 704 receives communication test results from the respective applications, and creates a list of the communication test results. The communication test result reception unit 704 also has a function of, in a case where the communication test result reception unit 704 does not receive a notification within a predetermined time after the communication test start notification unit 703 issues the communication test start instruction, performing timeout processing and determining the communication test result as a failure.

A communication test result notification unit 705 notifies the communication test result reception unit 603 of the list of the communication test results of the respective applications that is created by the communication test result reception unit 704. The communication test result notification unit 705 also has a function of transmitting the list of the communication test results to the database 400 via the platform server 200.

Figure 6:
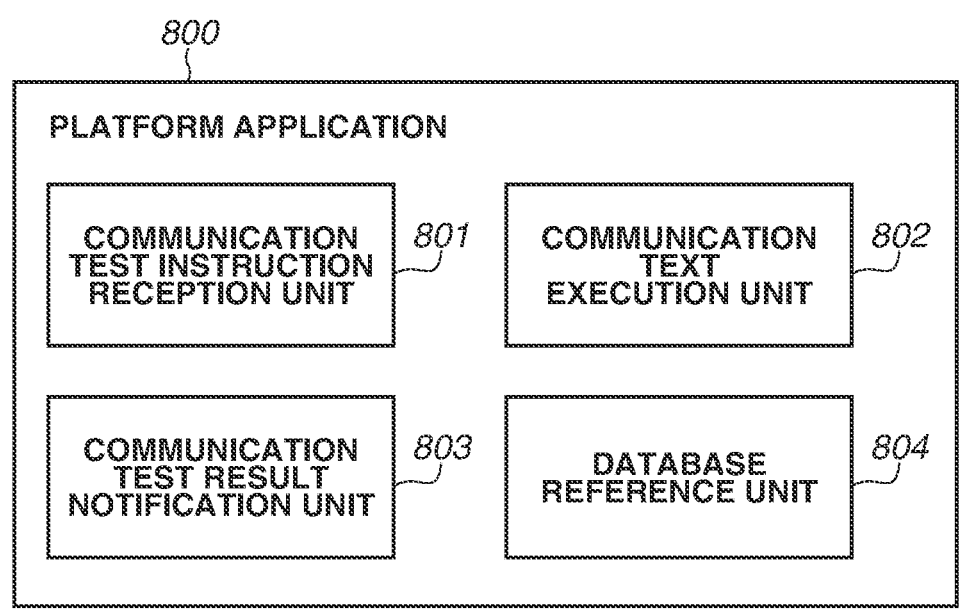
FIG. 6 is a block diagram illustrating a software configuration of a platform application.

FIG. 6 is a block diagram illustrating an example of a software configuration of the platform application 800. The software configuration functions when the CPU 502 of the image forming apparatus 500 executes the programs stored in the HDD 507.

A communication test instruction reception unit 801 receives the communication test start instruction issued by the communication test start notification unit 703.

A communication test execution unit 802 executes the communication test with the corresponding server. Contents of the communication test can be uniquely defined by each of the applications. The communication test execution unit 802 also has a function of holding a result of the communication test after completion of the communication test. The result of the communication test is assumed to include, for example, information indicating success or failure, an error code in a case where the communication test fails, an execution date of the communication test, and a time taken to execute the communication test, but the present exemplary embodiment is not limited thereto.

A communication test result notification unit 803 transmits the result of the communication test to the communication test result reception unit 704. At this time, the communication test result notification unit 803 can transmit data acquired by a database reference unit 804 (described below), together with the result.

The database reference unit 804 refers to the database 400 in the cloud server and acquires data via the platform server 200. Contents of the data to be acquired by the database reference unit 804 can be optionally changed based on the contents of the communication test uniquely defined by the platform application 800. The database reference unit 804 also has a function of transmitting various kinds of data on the image forming apparatus 500 to the cloud server and updating the database 400.

Figure 7:
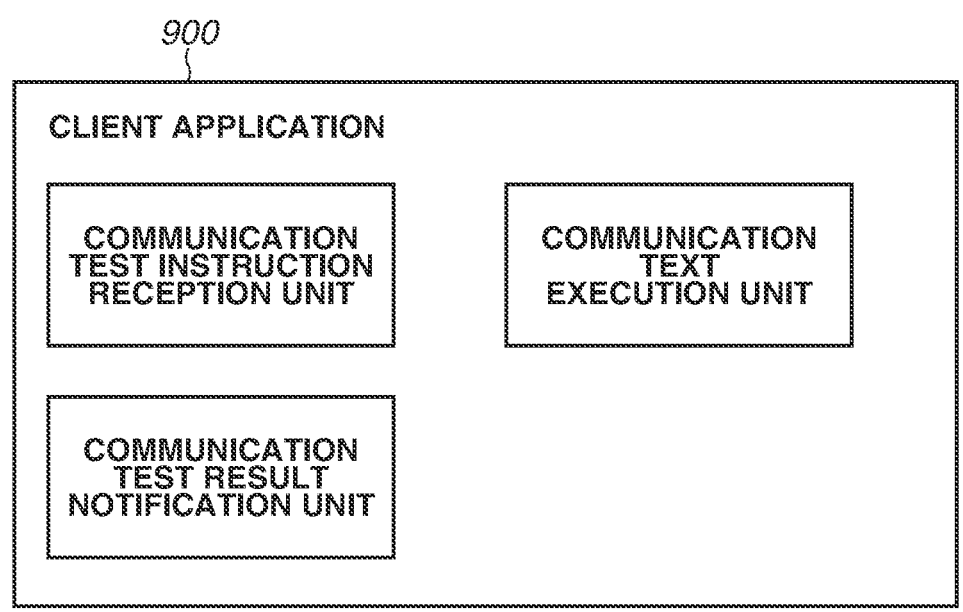
FIG. 7 is a block diagram illustrating a software configuration of a client application.

FIG. 7 is a block diagram illustrating an example of a software configuration of the client application 900. The software configuration functions when the CPU 502 of the image forming apparatus 500 executes the programs stored in the HDD 507.

In the present exemplary embodiment, the configuration of the client application 900 is assumed to be similar to the configuration of the platform application 800 except for the database reference unit 804. Thus, the description thereof will be omitted.

Figure 8:
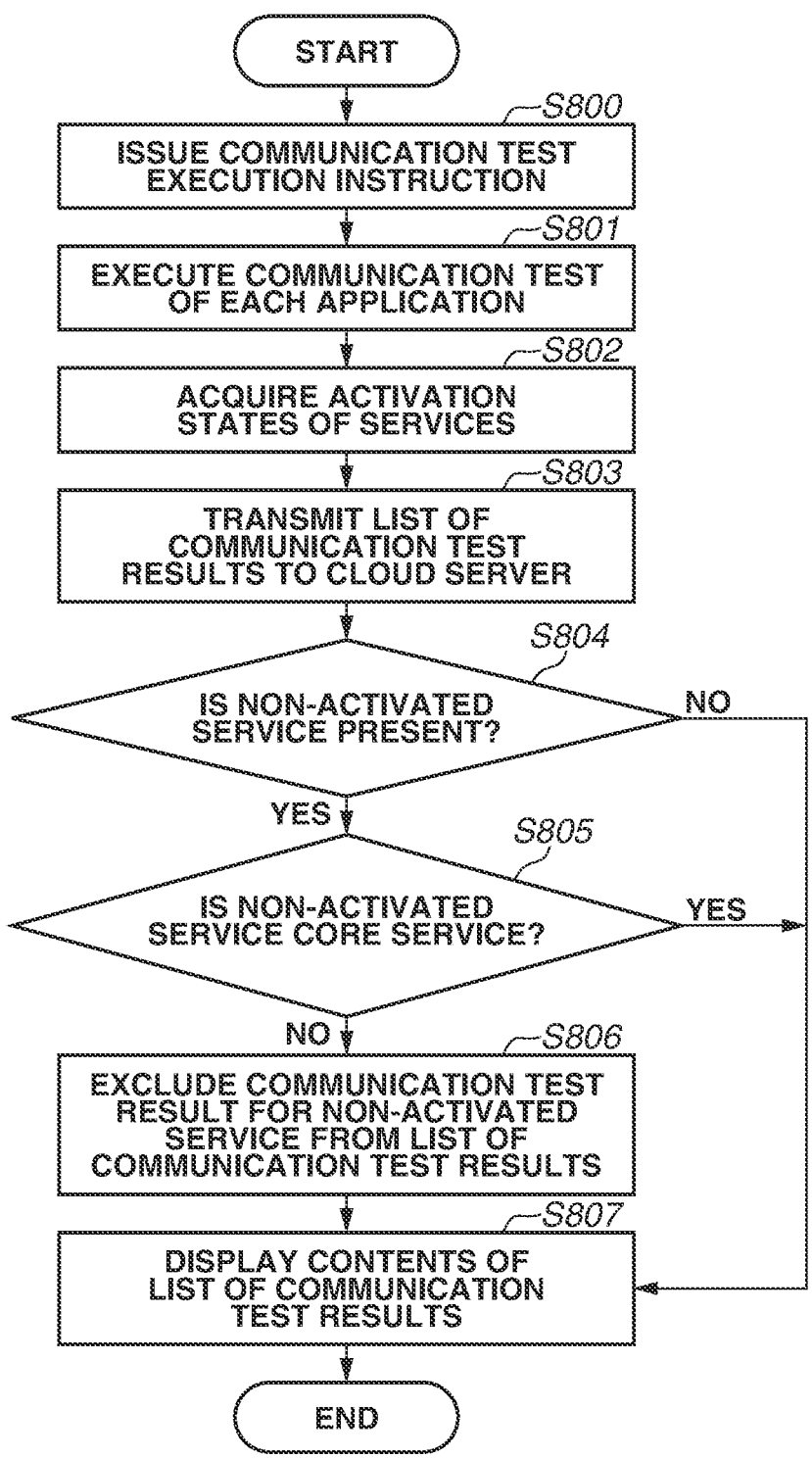
FIG. 8 is a flowchart illustrating communication test processing according to one or more aspects of the present disclosure.

FIG. 8 is a flowchart illustrating an example of communication test processing according to the present exemplary embodiment.

The processing is implemented by the CPU 502 of the image forming apparatus 500 executing the programs stored in the HDD 507.

In step S800, when the user performs an UI operation (when the user presses the communication test button 612), the communication test instruction unit 602 of the communication test management application 600 issues a communication test execution instruction in response to the UI operation. The issuance of the communication test execution instruction is not limited to the issuance in response to the UI operation, and can be programmed to be performed, for example, periodically at predetermined time intervals or at a set date.

In response to the issuance of the communication test execution instruction in step S800, the communication test start notification unit 703 instructs each of the applications to start the communication test. In step S801, each of the applications executes the communication test with the corresponding server in response thereto.

The communication test results of the respective applications are collected as the list of the communication test results by the communication test result reception unit 704 via the respective communication test result notification units. The data transmission and reception between the applications is assumed to be implemented by performing listener registration processing between the applications in advance, but the present exemplary embodiment is not limited thereto, and it is sufficient to implement cooperation between the applications using a given method.

In step S802, the database reference unit 804 of the platform application 800 acquires a service activation state list from the database 400 via the platform server 200. More specifically, the database reference unit 804 acquires a customer identifier (ID) based on information (e.g., a serial number) enabling unique identification of the image forming apparatus 500, and acquires the list of the activation states of the services associated with the customer ID. This acquisition processing can be performed independently of the execution of the communication test of the platform application 800 itself, or can be performed as a part of the communication test of the platform application 800 itself.

Table 1 illustrates an example of the activation state list acquired in step S802 of FIG. 8.

The example of Table 1 indicates that the user uses a service A and a service C but does not use a service B.

TABLE 1

| Serial number | Customer ID | Service name | State |
|---|---|---|---|
| ABC12345 | XYZ6789 | Service A | Activated |
| | | Service B | Non-activated |
| | | Service C | Activated |

The communication test result notification unit 803 then transmits, to the communication test result reception unit 704, the activation state list acquired by the platform application 800 in step S802, together with the communication test result in step S801. At this time, for example, a dedicated interface can be prepared to transmit the activation state list using a cooperation path different from that for the transmission of the communication test result. Steps S801 and S802 can be performed in reverse order.

In step S803, the communication test result notification unit 705 transmits, to the database 400, the list of the communication test results of the respective applications collected by the communication test result reception unit 704. At this time, all of the communication test results including the communication test result for a non-activated service (a non-contracted service) are transmitted to the cloud server, which enables the service provider and the user to confirm the results from a web browser or the like.

Although not illustrated, at the timing of step S803, the communication test result notification unit 705 transmits the list of the communication test results of the respective applications to the communication test result reception unit 603.

FIG. 9 illustrates an example of a communication test result details screen provided by the platform server 200. The screen can be referred to by access from the web browser to the platform server 200.

In other words, the platform server 200 provides the communication test results of the respective client applications in response to a request from the web browser or the like. In this screen, the communication test results of all of the client applications are displayed irrespective of the service contract state (whether the service is contracted or non-contracted).

The contents of the list of the communication test results are output in an area 1001. The list of the communication test results includes, for example, a list of clients (application names) corresponding to the communication tests, the service activation states (the contract states), the execution dates, the results, and the detailed information.

In a case where any of the communication tests fails, an error code and a message corresponding to the cause of the failure are displayed in a "details" column. Thus, in a case where the user intends to activate a service during operation of the image forming apparatus 500, the service provider and the user can confirm the state of communication with the corresponding client application in advance. In a case where the communication test fails, a network environment and a security setting can be reviewed before the activation, which makes it possible to prevent rework after the activation.

In step S804, the communication test result reception unit 603 determines whether the activation state list received in step S803 includes a non-activated service. In a case where the activation state list does not include a non-activated service (NO in step S804), the processing proceeds to step S807.

In a case where the activation state list includes a non-activated service (YES in step S804), the processing proceeds to step S805.

In step S805, the communication test result reception unit 603 determines whether the non-activated service is a core service. The core service indicates a service essential for the connection to the cloud server that is provided by the authorization server 100 or the platform server 200. In a case where there is a non-activated core service, the service engineer is to confirm the communication test result.

In a case where the non-activated service is a core service (YES in step S805), the processing proceeds to step S807.

In a case where the non-activated service is not a core service (NO in step S805), the processing proceeds to step S806.

In step S806, the communication test result reception unit 603 excludes the communication test result of the application corresponding to the non-activated service from the received list of the communication test results, and the processing proceeds to step S807.

In step S807, the UI display unit 601 receives the list of the communication test results from the communication test result reception unit 603, displays the communication test result details screen on the operation unit 501 of the image forming apparatus 500, and outputs the contents of the above-described list of the communication test results. FIG. 4C illustrates an example of the communication test result details screen. The screen illustrated in FIG. 4C is displayed after the confirm details button 611 in FIG. 4B is pressed and after the communication tests are completed. The displayed contents (in an area 620) are similar to the displayed contents in FIG. 9 except that the service activation states (the service use states) are not displayed and the communication test result of the client application corresponding to the non-activated service (the non-contracted service) is not displayed.

In the flowchart of FIG. 8, the processing in steps S804 to S806 is assumed to be performed by the communication test result reception unit 603 of the communication test management application 600. Alternatively, the processing in steps S804 to S806 can be performed by the communication test result reception unit 704 of the token provider application 700. In this case, the list of the communication test results from which a specific communication test result is excluded is passed to the communication test result reception unit 603 and is displayed.

As described above, according to the present exemplary embodiment, it is possible to provide a mechanism that performs, when an image forming apparatus executes communication tests with external services, control not to display the communication test result for a non-activated service on the UI of the image forming apparatus. This makes it possible to present only necessary results to the service engineer at the time of installation of the image forming apparatus. Further, all of the communication test results are transmitted to the cloud server. Thus, at the time of activation of a service, it is possible to confirm the communication test result for the service in advance and take action.

The above-described first exemplary embodiment is based on the premise that the communication tests are executed by the service engineer at the time of installation of the image forming apparatus 500. Thus, in some cases, the communication test management application 600 is controlled to be started up only from a screen operable by the service engineer. Meanwhile, in a case where the user activates a new service during operation of the image forming apparatus 500 or the network environment is changed, the communication tests are also to be executed and, if the service engineer is called each time, the cost is increased. To address the issue, a startup menu of the communication test management application 600 may be located in both of a screen operable by the user and a screen dedicated to the service engineer, and the UI and functionality may be switched depending on the screen from which the communication test management application 600 has been started up.

The user recognizes the network setting and security setting of the user's environment. Thus, in a case where the communication test with a non-activated service fails due to a defect in the settings, the user can confirm the cause of the failure and cope with the failure. In the configuration according to the above-described first exemplary embodiment, the communication test result for a non-activated service is not displayed. Thus, if the user intends to activate the service, the user is to access the cloud server from another terminal to confirm the communication test result, which is not efficient.

To address the issue, in a second exemplary embodiment, a configuration will be described in which the contents of the communication test results to be displayed are controlled based on information about the screen from which the communication test management application 600 has been started up.

Configurations according to the present exemplary embodiment are similar to those illustrated in FIGS. 1 to 7 and FIG. 9 described in the first exemplary embodiment. Thus, the description thereof will be omitted. Differences from the first exemplary embodiment will be described.

FIG. 10 is a flowchart illustrating an example of communication test processing according to the present exemplary embodiment. The processing is implemented by the CPU 502 of the image forming apparatus 500 executing the programs stored in the HDD 507. Steps S800 to S807 in FIG. 10 are similar to those in FIG. 8 described in the first exemplary embodiment. Thus, the description thereof will be omitted.

In step S1000, when the UI of the communication test management application 600 is opened, the UI display unit 601 acquires identification information indicating the screen from which the UI has been opened. More specifically, the UI display unit 601 acquires the identification information from the operation unit I/F 504 of the image forming apparatus 500, and holds the identification information. For example, this can be implemented by adding an identification ID to a button (not illustrated) for opening the UI of the communication test management application 600, or can be implemented by acquiring a screen ID of an original screen.

In the present exemplary embodiment, when the communication test result notification unit 705 transmits the list of the communication test results of the respective applications to the database 400 in step S803, the communication test result reception unit 603 performs processing in step S1001.

In step S1001, the communication test result reception unit 603 determines the screen from which the UI of the communication test management application 600 has been started up, based on the identification information acquired in step S1000. In a case where the identification information has a value indicating that the UI has been started up from the screen dedicated to the service engineer (YES in step S1001), the processing proceeds to step S804. In a case where the identification information has a value indicating that the UI has been started up from the screen operable by the user (NO in step S1001), the processing proceeds to step S807.

More specifically, in a case where the user (who is not a service engineer) executes the communication tests with the external services in the image forming apparatus 500 (in a user mode), the communication test results including the communication test result for a non-activated service can be displayed on the UI of the image forming apparatus 500. In a case where the service engineer executes the communication tests with the external services in the image forming apparatus 500 (in a service engineer mode), the communication test results excluding the communication test result for a non-activated service can be displayed on the UI of the image forming apparatus 500.

As described above, according to the present exemplary embodiment, in a case where the user executes the communication tests (in a case where the user mode is executed), the communication test results including the communication test result for a non-activated service can be displayed on the UI of the image forming apparatus 500. This enables the user to efficiently confirm and set the network environment for the service that the user intends to activate.

As described above, according to each of the exemplary embodiments, when a network device such as an image forming apparatus executes communication tests with external services, it is possible to perform control not to display the communication test result of a client application corresponding to a non-activated service. As a result, it is possible to notify the service engineer of only necessary information, and enable the service engineer to confirm the communication test results without misunderstanding. Accordingly, among the results of the communication tests executed by the network device, such as the image forming apparatus, for the services provided by the service provision system, the service engineer can be notified of only necessary results, and can confirm the communication test results without confusion and misunderstanding.

The configurations and contents of various kinds of data according to the above-described exemplary embodiments are not limited to those described above, and the various kinds of data has various configurations and contents depending on the application and purpose.

Although the exemplary embodiments have been described above, the present disclosure can take an embodiment as, for example, a system, an apparatus, a method, a program, or a storage medium other than the above. More specifically, an exemplary embodiment of the present disclosure can be applied to a system including a plurality of apparatuses or to a single apparatus.

Each of the above-described exemplary embodiments can be implemented by supplying a program for implementing one or more functions according to the exemplary embodiments to a system or an apparatus via a network or a storage medium, and causing one or more processors in a computer of the system or the apparatus to read out and execute the program. Each of the above-described exemplary embodiments can also be implemented by a circuit (e.g., an application specific integrated circuit (ASIC)) for implementing the one or more functions.

The exemplary embodiments of the present disclosure are not limited to the above-described exemplary embodiments. Various modifications (including organic combinations of the exemplary embodiments) can be made based on the spirit of the present disclosure, and are not excluded from the scope of the exemplary embodiments of the present disclosure. Configurations obtained by combining the above-described exemplary embodiments and the modifications thereof are all included in the exemplary embodiments of the present disclosure.

According to the exemplary embodiments of the present disclosure, among the results of communication tests, executed by a network device, for the services provided by a service provision system, a service engineer can be notified of only necessary results and can confirm the communication test results without confusion and misunderstanding.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-094791, filed Jun. 13, 2022, which is hereby incorporated by reference herein in its entirety.

What is claimed is:

1. A network device on which a plurality of client applications respectively corresponding to a basic service and a contract-based service that are provided by a service provision system is installed, the network device comprising:
a display;
at least one memory storing instructions; and
at least one processor executing the instructions causing the network device to:
instruct both of a first client application corresponding to the basic service and a second client application corresponding to the contract-based service, among the plurality of client applications, to execute communication tests with the first client application for the basic service and the second client application the contract-based service, respectively;
receive communication test results respectively from the first client application and the second client application;
determine whether the contract-based service is in a contracted state or a non-contracted state;
transmit the communication test result of the first client application and the communication test result of the second client application to the service provision system based on the contracted state or the non-contracted state determined;
in a case where the contract-based service is in the contracted state, display both of the communication test result of the first client application and the communication test result of the second client application on the display; and
in a case where the contract-based service is in the non-contracted state, display the communication test result of the first client application on the display without displaying the communication test result of the second client application.

2. The network device according to claim 1, wherein the communication test results are transmitted using the first client application corresponding to the basic service.

3. The network device according to claim 1, wherein the service provision system manages the communication test results with the first client application and the second client application and provides the communication test results with the first client application and the second client application via a network.

4. The network device according to claim 1,
wherein, in each of a first mode where a service engineer performs an operation and a second mode where a user who is not the service engineer performs an operation, an instruction to execute the communication tests is issued, and
wherein the instructions further cause the network device to, in a case where the instruction to execute the communication tests is issued in the second mode, display both of the communication test result of the first client application and the communication test result of the second client application on the display irrespective of a contract state based on the contracted state or non-contracted state of the contract-based service.

5. The network device according to claim 1,
wherein the service provision system manages at least a contract state based on the contracted state or non-contracted state of the contract-based service, and
wherein the instructions further cause the network device to acquire the contract state of the contract-based service from the service provision system.

6. The network device according to claim 5, wherein the contract state is acquired from the service provision system by using the first client application corresponding to the basic service.

7. A method for controlling a network device on which a plurality of client applications respectively corresponding to a basic service and a contract-based service that are provided by a service provision system is installed, the method comprising:
instructing both of a first client application corresponding to the basic service and a second client application corresponding to the contract-based service, among the plurality of client applications, to execute communication tests with the first client application for the basic service and the second client application the contract-based service, respectively;
receiving communication test results respectively from the first client application and the second client application;
determining whether the contract-based service is in a contracted state or a non-contracted state;
transmitting the communication test result of the first client application and the communication test result of the second client application to the service provision system based on the contracted state or the non-contracted state determined;
in a case where the contract-based service is in the contracted state, displaying both of the communication test result of the first client application and the communication test result of the second client application on a display of the network device; and
in a case where the contract-based service is in the non-contracted state, displaying the communication test result of the first client application on the display without displaying the communication test result of the second client application.

* * * * *